United States Patent
Roach

(10) Patent No.: US 11,365,825 B2
(45) Date of Patent: Jun. 21, 2022

(54) ACTUATOR FAIL FIX SYSTEM

(71) Applicant: General Electric Company, Schenectady, NY (US)

(72) Inventor: Roger Michael Roach, Topsfield, MA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/228,375

(22) Filed: Apr. 12, 2021

(65) Prior Publication Data

US 2021/0239235 A1 Aug. 5, 2021

Related U.S. Application Data

(63) Continuation of application No. 16/191,791, filed on Nov. 15, 2018, now Pat. No. 10,975,979.

(51) Int. Cl.
*F16K 31/122* (2006.01)
*F16H 25/20* (2006.01)
(Continued)

(52) U.S. Cl.
CPC ....... *F16K 31/1221* (2013.01); *F16H 25/205* (2013.01); *F16H 25/2015* (2013.01); *F16H 37/0826* (2013.01); *F16K 31/043* (2013.01)

(58) Field of Classification Search
CPC .. F16K 31/1221; F16K 31/043; F16H 25/205; F16H 25/2015; F16H 37/0826;
(Continued)

(56) References Cited

U.S. PATENT DOCUMENTS 2,809,736 A 10/1957 Hoover
2,857,775 A 10/1958 Ochtman
(Continued)

FOREIGN PATENT DOCUMENTS

CN 2169724 6/1994
CN 2321966 6/1999
(Continued)

OTHER PUBLICATIONS

European Patent Office, "Extended European Search Report", issued in connection with application No. 19206428.5 dated Mar. 18, 2020, 10 pages.
(Continued)

*Primary Examiner* — Vinh Luong
(74) *Attorney, Agent, or Firm* — Hanley, Flight & Zimmerman, LLC

(57) ABSTRACT

An actuator assembly including a fail-fix system is provided. The actuator assembly includes an output shaft, an input drive assembly, and a piston assembly. The piston assembly includes a body surrounding a piston moveable within the body. The body defines a first end and a second end opposite thereof between which the piston is moveable within the body. The piston assembly includes a spring disposed at the first end between the body and the piston. The piston assembly includes a friction mechanism disposed at the second end of the piston opposite of the first end. An adjustable area is defined within the body between the second end of the piston and the input drive assembly.

20 Claims, 4 Drawing Sheets

(51) Int. Cl.
*F16H 37/08* (2006.01)
*F16K 31/04* (2006.01)

(58) Field of Classification Search
CPC .......... F16D 65/853; F03C 1/00; F03C 1/047; F04B 1/047
See application file for complete search history.

(56) References Cited

U.S. PATENT DOCUMENTS

| | | | |
|---|---|---|---|
| 3,722,637 | A | 3/1973 | Kershner |
| 4,103,392 | A | 8/1978 | MacDonald |
| 4,179,944 | A | 12/1979 | Conner |
| 4,699,355 | A | 10/1987 | Tomlin et al. |
| 6,142,416 | A | 11/2000 | Markstein et al. |
| 6,508,340 | B1 | 1/2003 | Bunker |
| 7,909,147 | B1 * | 3/2011 | Schnell .................. F16D 65/853 188/264 D |
| 8,840,507 | B2 | 9/2014 | Himmelmann et al. |
| 10,975,979 | B2 | 4/2021 | Roach |
| 11,067,144 | B2 * | 7/2021 | Engrand ............... F16D 65/853 |
| 2009/0050832 | A1 | 2/2009 | Ejiri |
| 2010/0064885 | A1 | 3/2010 | Werkhoven |
| 2011/0088991 | A1 | 4/2011 | Robinson |
| 2012/0019050 | A1 | 1/2012 | Feusse |
| 2013/0248303 | A1 | 9/2013 | Okuno et al. |
| 2013/0334868 | A1 | 12/2013 | Feusse et al. |
| 2014/0183385 | A1 * | 7/2014 | Adams ................ F15B 15/1438 251/128 |
| 2016/0069404 | A1 | 3/2016 | Feusse et al. |
| 2017/0122420 | A1 | 5/2017 | Armstrong |
| 2017/0239770 | A1 | 8/2017 | Tachiki |
| 2018/0093660 | A1 | 4/2018 | Koshiba et al. |
| 2018/0106355 | A1 | 4/2018 | Canto Michelotti |
| 2019/0032811 | A1 | 1/2019 | Brito |

FOREIGN PATENT DOCUMENTS

| | | | |
|---|---|---|---|
| CN | 103097759 | | 5/2013 |
| CN | 105257626 | | 1/2016 |
| CN | 205064432 | | 3/2016 |
| EP | 2626590 | | 8/2013 |
| EP | 3653889 | A1 * | 5/2020 ............. F15B 15/26 |
| JP | S58220976 | | 12/1983 |

OTHER PUBLICATIONS

Chinese Patent Office, "Office Action," issued in connection with application No. 2019111202955 dated Feb. 23, 2021, 11 pages.

United States Patent and Trademark Office, "Non-Final Office Action," issued in connection with U.S. Appl. No. 16/191,791, dated Aug. 5, 2020, 17 pages.

United States Patent and Trademark Office, "Notice of Allowance and Fee(s) Due," issued in connection with U.S. Appl. No. 16/191,791, dated Dec. 16, 2020, 10 pages.

China National Intellectual Property Administration, "Office Action", issued in connection with Chinese Patent Application No. 201911120295.5 dated Sep. 23, 2021, 4 pages. (English Translation Included).

* cited by examiner

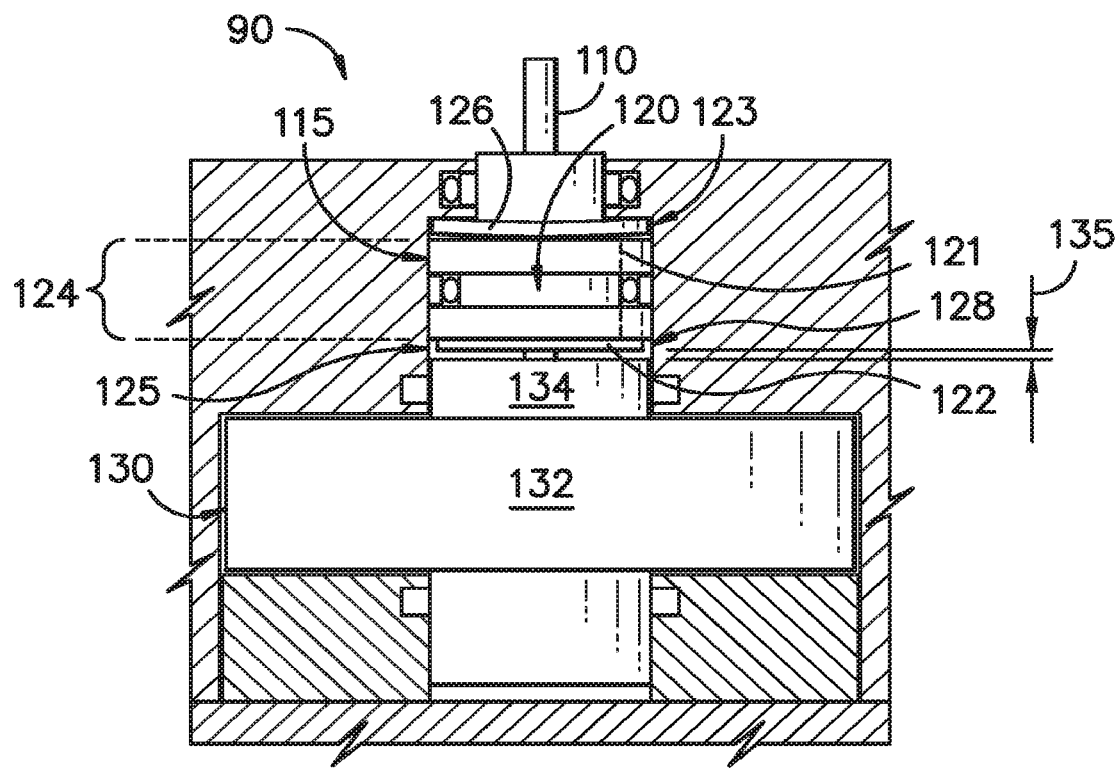
FIG. -1A-
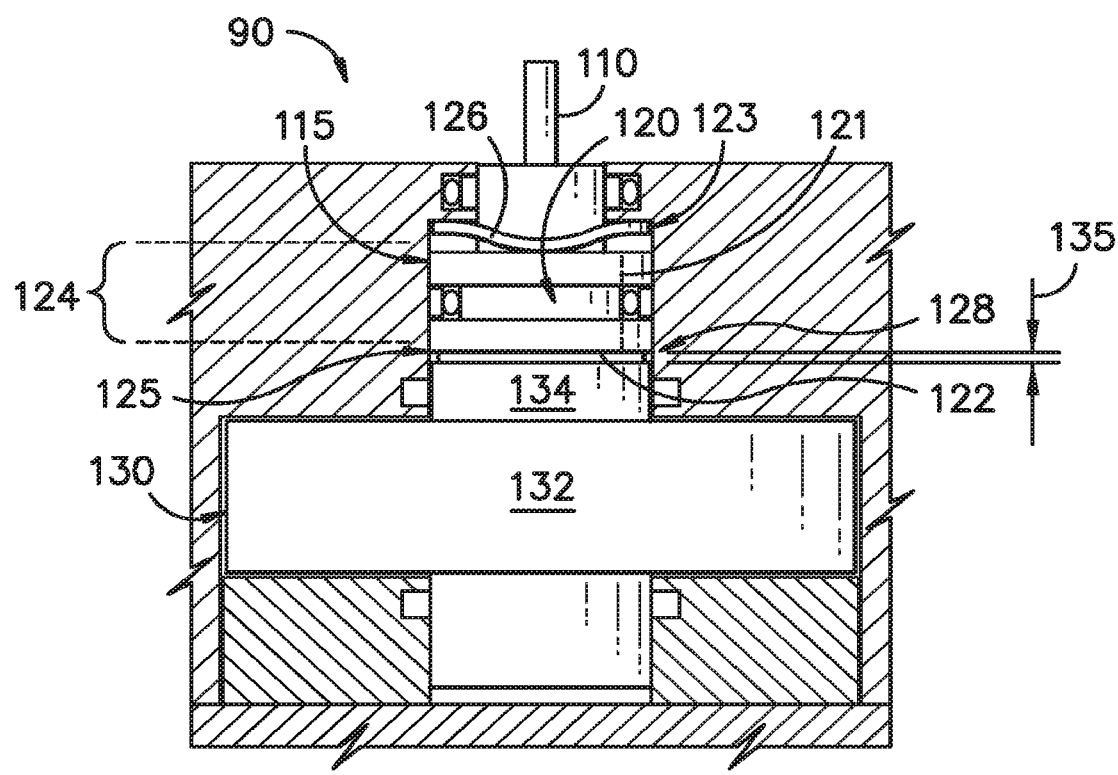
FIG. -1B-

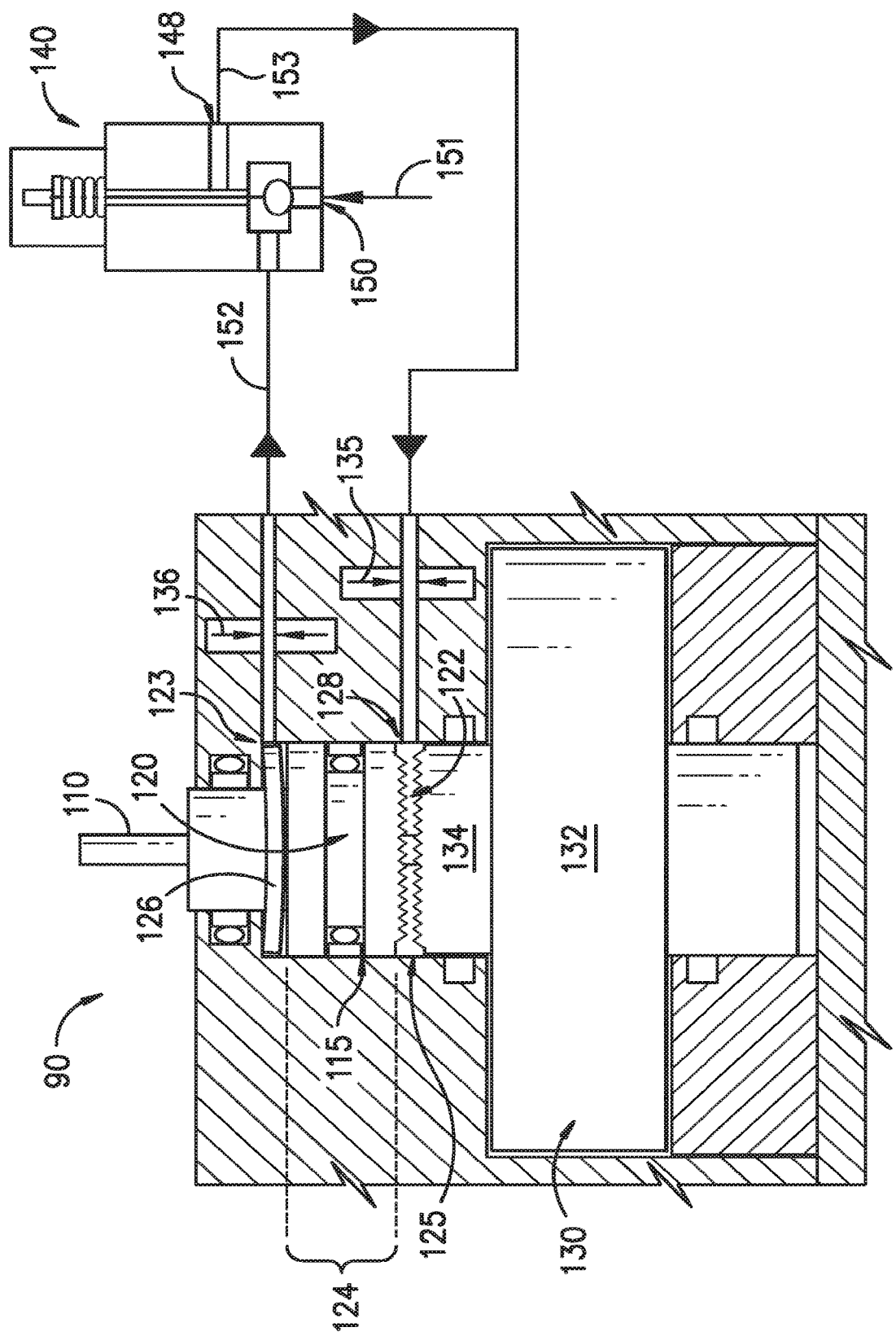
FIG. -2A-

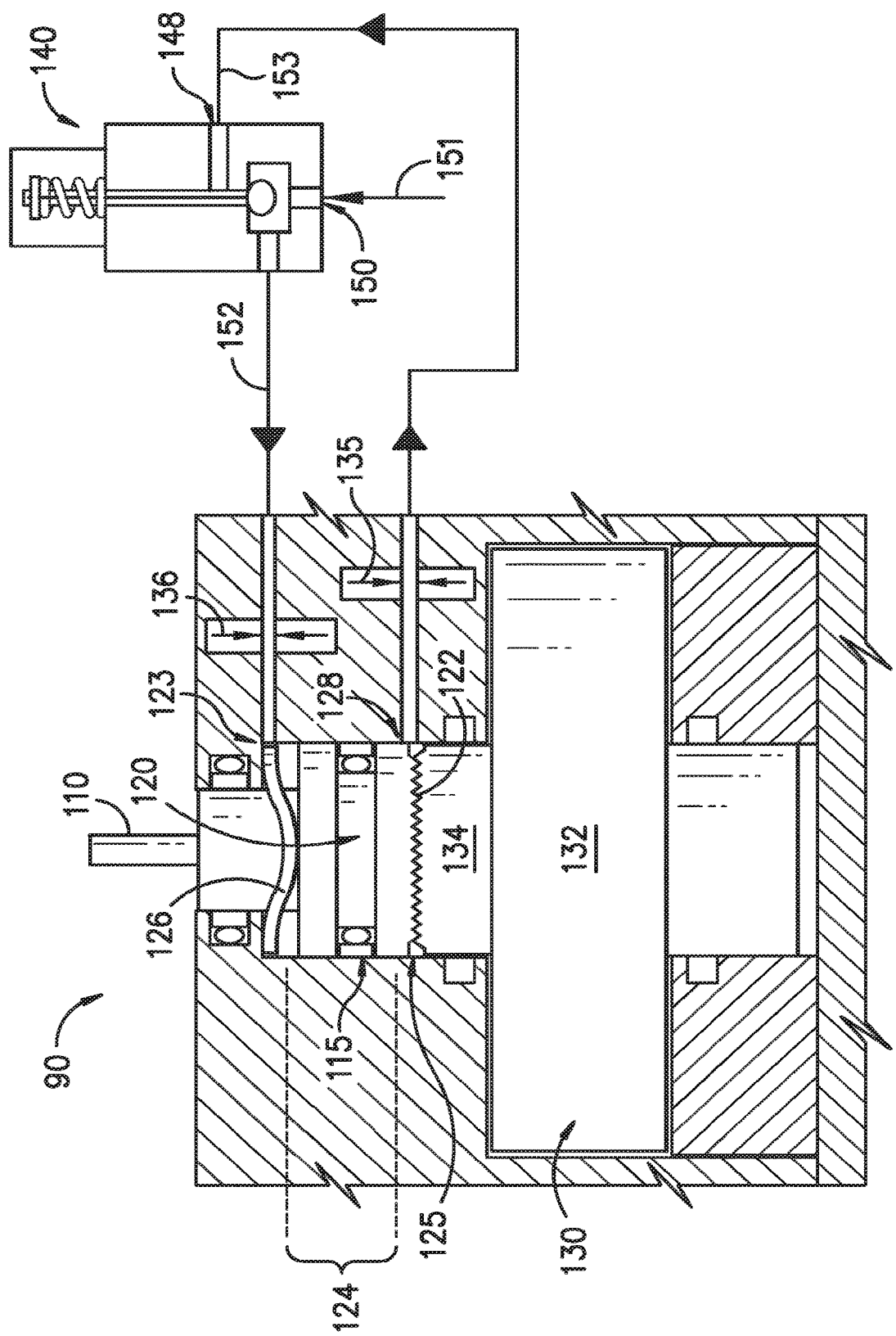
FIG. -2B-

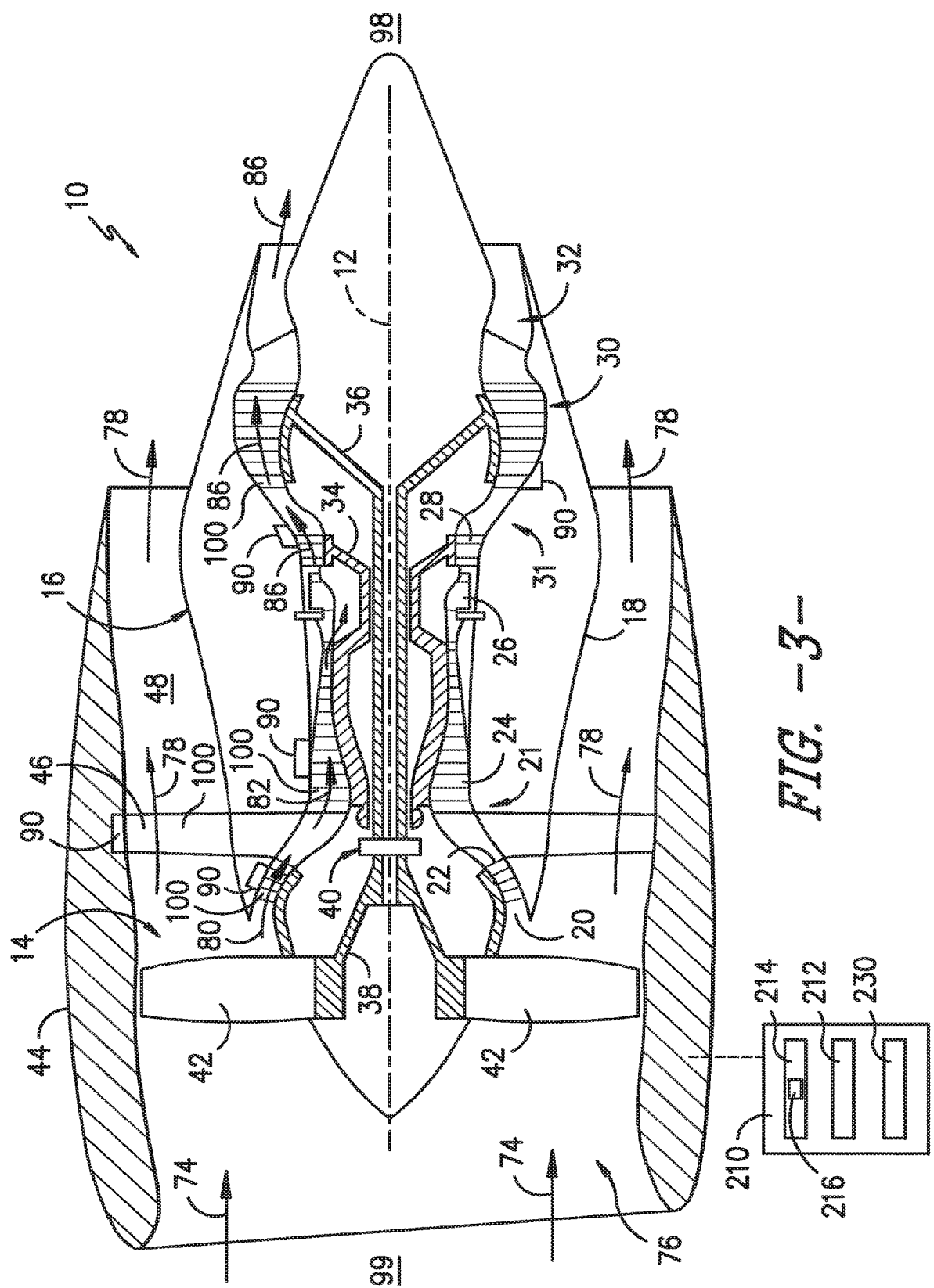
FIG. -3-

ACTUATOR FAIL FIX SYSTEM

RELATED APPLICATIONS

This patent arises from a continuation of U.S. patent application Ser. No. 16/191,791, filed on Nov. 15, 2018, and entitled "Actuator Fail Fix System." U.S. patent application Ser. No. 16/191,791 is hereby incorporated by reference in its entirety. Priority to U.S. patent application Ser. No. 16/191,791 is hereby claimed.

FIELD

The present subject matter relates generally to fail fix structures for actuator assemblies.

BACKGROUND

Actuator assemblies, such as rotary actuator assemblies, may change position following failure of an input signal or pressure source, thereby moving from a last-commanded position before the failure. As such, in certain apparatuses, such as turbo machines, actuator assemblies coupled to variable vane assemblies may undesirably enable movement of the vane assembly following failure of the actuator assembly, such as loss of an electrical input signal or motive pressure source. Failure of the actuator assembly may therefore compound into failures at the turbo machine by undesirably allowing uncommanded changes in vane angle due to loss of actuator assembly control. Such uncommanded changes may adversely affect turbo machine operation, including stall or surge.

Additionally, or alternatively, there is a need for fail fix systems that reduce weight and complexity over known systems that may include multiple components separate or from the actuator assembly or housing.

As such, there is a need for fail fix systems for actuator assemblies that disable or mitigate undesired movement of the system following failure of an input control.

BRIEF DESCRIPTION

Aspects and advantages of the invention will be set forth in part in the following description, or may be obvious from the description, or may be learned through practice of the invention.

An aspect of the present disclosure is directed to actuator assembly including a fail-fix system. The actuator assembly includes an output shaft, an input drive assembly, and a piston assembly. The piston assembly includes a body surrounding a piston moveable within the body. The body defines a first end and a second end opposite thereof between which the piston is moveable within the body. The piston assembly includes a spring disposed at the first end between the body and the piston. The piston assembly includes a friction mechanism disposed at the second end of the piston opposite of the first end. An adjustable area is defined within the body between the second end of the piston and the input drive assembly.

In one embodiment, the body defines a groove extended laterally between the first end and the second end, in which the piston is at least partially disposed in the groove to prevent rotation of the piston.

In another embodiment, the friction mechanism includes a friction disc configured to engage together the piston and the input drive assembly.

In still another embodiment, the friction mechanism includes a serrated geometry at the servo piston and the input shaft, in which the serrated geometry is configured to statically couple together the servo piston and the input drive assembly.

In yet another embodiment, the body defines an opening therethrough in fluid communication with the area between the piston and the input drive assembly.

In various embodiments, the actuator assembly further includes a control valve assembly configured to provide and egress a motive fluid to the area between the piston and the input drive assembly. In one embodiment, the control valve assembly is configured to provide the motive fluid to the area between the piston and the input drive assembly equal and opposite to a force applied by the spring toward the input drive assembly. In another embodiment, the control valve assembly is configured to egress the motive fluid from the area between the piston and the input drive assembly following loss of a signal to the control valve assembly. In one embodiment, the piston assembly is configured to engage the input drive assembly via the friction mechanism following egress of the motive fluid from the area between the piston and the input drive assembly.

In one embodiment, the piston defines one or more of a stop collar or a servo-controller piston.

Another aspect of the present disclosure is directed to an apparatus for fail fix actuation. The apparatus includes an actuator assembly including an output shaft, an input drive assembly, and a piston assembly. The piston assembly includes a body surrounding a piston moveable within the body. The body defines a first end and a second end opposite thereof between which the piston is moveable within the body. The piston assembly includes a spring disposed at the first end between the body and the piston. The piston assembly includes a friction mechanism disposed at the second end of the piston opposite of the first end. An adjustable area is defined within the body between the second end of the piston and the input drive assembly. The actuator assembly further includes a control valve assembly configured to provide and egress a motive fluid to the area between the piston and the input drive assembly. The apparatus includes a controller configured to provide a signal to the control valve of the actuator assembly.

In on embodiment, the controller provides the signal for the control valve assembly to close an input opening at the control valve assembly. Closing the input opening maintains the motive fluid at the area between the piston and the input drive assembly equal and opposite to a force applied by the spring toward the input drive assembly.

In various embodiments, the control valve assembly is configured to egress the motive fluid from the area between the piston and the input drive assembly following loss of the signal from the controller to the control valve assembly. In one embodiment, the control valve assembly is configured to close an input opening at the control valve assembly to disable the motive fluid from the area between the piston and the input drive assembly. In another embodiment, the piston assembly is configured to engage the input drive assembly via the friction mechanism following egress of the motive fluid from the area between the piston and the input drive assembly.

In one embodiment, the body defines a groove extended laterally between the first end and the second end, and wherein the piston is at least partially disposed in the groove to prevent rotation of the piston.

In another embodiment, the friction mechanism comprises a friction disc configured to engage together the piston and the input drive assembly.

In yet another embodiment, the friction mechanism comprises a serrated geometry at the servo piston and the input shaft, in which the serrated geometry is configured to statically couple together the servo piston and the input drive assembly.

In still another embodiment, the body defines an opening therethrough in fluid communication with the area between the piston and the input drive assembly.

In still yet another embodiment, the piston defines one or more of a stop collar or a servo-controller piston.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1A is an exemplary embodiment of an actuator assembly depicting disengagement from an input drive assembly according to an aspect of the present disclosure;

FIG. 1B is an exemplary embodiment of the actuator assembly of FIG. 1A depicting engagement with the input drive assembly according to an aspect of the present disclosure;

FIG. 2A is an exemplary embodiment of an actuator assembly depicting disengagement from an input drive assembly according to an aspect of the present disclosure;

FIG. 2B is an exemplary embodiment of the actuator assembly of FIG. 2A depicting engagement with the input drive assembly according to an aspect of the present disclosure; and FIG. 3 is a schematic cross sectional view of an exemplary apparatus including embodiments of actuator assembly according to aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of an actuator assembly including a fail fix system that may disable or mitigate undesired movement of the actuator system following failure of an input control are generally provided. The actuator assembly shown and described herein provides a system within a rotary actuator assembly to disable or mitigate undesired movement of the rotary actuator output shaft following failure of an input control signal. Embodiments of the actuator assembly include a stop collar or servo piston keyed or slotted into a surrounding body to prevent rotation of the collar or piston. A spring is incorporated onto the first end of the piston maintains the piston loaded onto a vane shaft or input drive assembly. A control valve assembly, such as a control solenoid valve, provides a motive fluid to a second end of the piston opposite of the first end such as to balance the load applied from the spring during non-failed operation of the actuator assembly.

Following loss of signal from the control valve assembly, the motive fluid is discontinued to the second end of the piston and the spring is allowed to apply a compressive force to move the piston to the vane shaft or input drive assembly. A friction mechanism, such as a friction disc or tooth geometry, at the second end of the piston engages the input drive assembly. The piston, slotted or keyed into the surrounding body, now engaged with the input drive assembly, prevents rotation of the input drive assembly and therefore the output shaft. The minimal distance between the second end of the piston and the input drive assembly mitigates an amount of movement that may occur following control signal failure. As such, undesired movement of an apparatus attached to the actuator assembly, such as a vane assembly, is mitigated or disabled. Additionally, or alternatively, the last commanded position of the output shaft is substantially maintained following loss of control signal.

When incorporated into a turbo machine, embodiments of the actuator assembly shown and described herein may mitigate stalls, surges, or other undesired operation of the turbo machine that may result from undesired changes in vane angle at a vane assembly following loss of control signal.

Referring now to the drawings, FIGS. 1A-1B and FIGS. 2A-2B provide exemplary embodiments of an actuator assembly 90 according to aspects of the present disclosure. The actuator assembly 90 includes an output shaft 110 coupled to an input drive assembly 130. The output shaft 110 is extended through a piston assembly 120 within a surrounding body 115. The body 115 defines a first end 123 separated laterally from a second end 125 with a stop collar or servo-controlled piston 124 therebetween. The piston assembly 120 is detachably coupled at the second end 125 to the input drive assembly 130. In various embodiments, the input drive assembly 130 includes an actuator mechanism 132 and input shaft 134 detachably coupled to the piston assembly 120. In one embodiment, the actuator mechanism 132 includes an actuator vane assembly defining a rotary type actuator drive by a motive fluid. The motive fluid may include one or more of a lubricant or hydraulic fluid or a pneumatic fluid, or another suitable motive fluid to actuate the input drive assembly 130 and rotate or otherwise displace the output shaft 110.

The piston assembly 120 including the stop collar or servo-controlled piston 124 is moveable within the body 115 surrounding the piston 124. The piston 124 is moveable within the body 115 between the opposing ends 123, 125 within the body 115 of the piston assembly 120, such as further described below. In one embodiment, the surrounding body 115 is keyed or otherwise grooved 121 laterally between first end 123 and the second end 125. The piston 124 defines a key or other raised structure in the groove 121 such as to prevent rotation of the piston 124. A friction mechanism 122 is coupled to the piston 124 at the second end 125. The piston 124 is releaseably coupled to the input shaft 134 of the input drive assembly 130 via the friction mechanism 122. FIGS. 1A and 2A each depict the piston assembly 120 disengaged from the input drive assembly 130. FIGS. 1B and 2B each depict the piston assembly 120 engaged with the input drive assembly 130. Together, FIGS. 1A-1B and FIGS. 2A-2B depict the piston assembly 120 releaseably engaged to the input drive assembly 130 such as further described herein.

In one embodiment, such as depicted in regard to FIGS. 1A-1B, the friction mechanism 122 defines a clutch mechanism or friction disc configured to engage the input drive assembly 130 when the piston 124 is moved onto the input drive 124. The friction mechanism 122 defining a friction disc includes a minimal stroke or area 135 between the friction mechanism 122 at the second end 125 and the input drive assembly 130, such as to improve fail safe position and response time such as further described below.

In another embodiment, such as depicted in regard to FIGS. 2A-2B, the friction mechanism 122 defines a notched tooth or serrated geometry at the input drive assembly 130 and the piston 124. The serrated geometry of the friction mechanism 122 may provide improved mechanical engagement force for disabling undesired rotation of the output shaft 110. The friction mechanism 122 defining the friction disc (FIGS. 1A-1B) may provide an improved response time relative to the serrated geometry (FIGS. 2A-2B), such as to enable the minimum stroke or area 135 between the second end 125 of the piston 124 to be less than the tooth height of the serrated geometry. As further described herein, the piston 124 may displace toward the second end 125 to contact the input drive assembly 130. The input drive assembly 130 may rotate only insofar as the friction mechanism 122, such as the serrated geometry, may allow (e.g., corresponding to the tooth geometry depicted in FIGS. 2A-2B).

Referring to FIGS. 1A-1B and FIGS. 2A-2B, various embodiments of the actuator assembly 90 include a spring 126 coupled at the first end 123 of the piston 124 and the body 115. The spring 126 is disposed within the body 115 of the piston assembly 120 such as to act against the body 115 and the first end 123 of the piston 124. An opening 128 is defined through the body 115 in fluid communication with the area 135 within the body 115. The opening 128 is further defined at the second end 125 between the piston 124 and the input drive assembly 130, such as to receive and egress a fluid 153 within the area 135 such as further described below.

Referring to FIGS. 2A-2B, a schematic embodiment of the actuator assembly 90 further including a control valve assembly 140 is depicted. The control valve assembly 140 includes a first input pressure opening 150 configured to receive a liquid or gaseous motive fluid, depicted schematically via arrows 151. The motive fluid 151 may generally include a hydraulic or pneumatic high pressure source, such as in fluid communication with the input drive assembly 130 to rotate or displace the output shaft 110.

During non-failed operation of the actuator assembly 90 or surrounding apparatus 10, an electrical signal is applied to the control valve assembly 140 to disable pressure or force from the motive fluid 151, such as via closing the input opening 150 at the control valve assembly 140 through which the motive fluid 151 may enter the control valve assembly 140. The control valve assembly 140 is actuated such as to enable at least a portion of the motive fluid, shown schematically via arrows 153, to flow from an opening 148 at the control valve assembly 140 into the area 135 within the body 115 between the piston 124 and the input drive assembly 130 at the second end 125, such as depicted in regard to FIG. 2A. The spring 126 provides a compressive force toward the input drive assembly 130 and the motive fluid 153 provides a counteracting force such as to prevent coupling of the piston 124 to the input drive assembly 130 at the friction mechanism 122. In other words, pressure on opposing sides 123, 125 of the piston 124 is substantially equal and opposite during non-failed operation. The motive fluid 153 permits the piston 124 to displace away from the input drive assembly 130 such as to enable free movement of the input drive assembly 130 and the output shaft 110 coupled thereto.

Referring now to FIG. 2B, following loss of an electrical signal to the control valve assembly 140, the control valve assembly 140 is no longer energized and, as such, the motive fluid 151 input to the control valve assembly 140 is allowed to displace the control valve assembly 140 such as to discontinue pressurized output of the motive fluid 153 from the control valve assembly 140 and enable the input motive fluid 151 from the control valve 140 to enter the plenum 136 (depicted schematically via arrows 152) such as to reduce the area 135 at the second end 125 of the body 115. The de-pressurized fluid 153 is returned from the body 115 to the control valve assembly 140 via the force exerted by the spring 126 and the motive fluid 152 in the plenum 136 toward the input drive assembly 130, and reducing the area 135 between the piston 124 and the input drive assembly 130. The area 135 is closed as the friction mechanism 122 establishes contact of the piston 124 to the input drive assembly 130, thereby disabling undesired or additional rotation of the output shaft 110 following failure of a control system or other input power or actuation source.

Various embodiments of the piston 124 may define a half-area servo piston enabling movement away from the input drive assembly 130 (e.g., toward the first end 123) when substantially equal pressure is applied to the opposing ends 123, 125 or the plenum 136 and the area 135, thereby allowing freedom of movement of the input drive assembly 130. For example, the half-area servo piston may be defined smaller relative to the input drive assembly 130. In other embodiments, the piston 124 may define a non-half area servo piston applying a demanded loading to either or both ends 123, 125 of the piston 124.

It should be appreciated that features illustrated or described as part of FIGS. 1A-1B may be used with features illustrated as part of FIGS. 2A-2B, or further in regard to the apparatus of FIG. 3 described further below. For example, the control valve 140 depicted in regard to FIGS. 2A-2B may be used and operated in regard to the embodiments shown and described in regard to FIGS. 1A-1B. As another example, one or more controllers configured to provide and/or receive signals to and from the actuator assembly 90 and/or further including the control valve 140 may be configured as part of the apparatus further described in regard to FIG. 3 below.

FIG. 3 is a schematic partially cross-sectioned side view of an exemplary apparatus 10 at which embodiments of the actuator assembly 90 may be incorporated. Although generally depicted herein as a gas turbine engine defining a turbofan configuration, the apparatus 10 shown and described herein may define any system including an actuation system such as described herein. Additionally, or alternatively, although depicted as a gas turbine engine defining a turbofan, the apparatus 10 may define a turbo machine generally, or more specifically a turbojet, turboprop, or turboshaft gas turbine engine configuration, including those for industrial or marine use, or a steam turbine engine. As shown in FIG. 3, the apparatus 10 has a longitudinal or axial centerline axis 12 that extends there through for reference purposes. An upstream end 99 and a downstream end 98 are each defined for reference purposes, generally denoting a direction from which air enters into the apparatus 10 (i.e., the upstream end 99) and a direction to which air exits the apparatus 10 (i.e., the downstream end 98). In general, the apparatus 10 may include a fan assembly 14 and a core engine 16 disposed downstream of the fan assembly 14.

The core engine 16 may generally include a substantially tubular outer casing 18 that defines an annular inlet 20. The outer casing 18 encases or at least partially forms, in serial flow relationship, a compressor section 21 having a booster or low pressure (LP) compressor 22, a high pressure (HP) compressor 24, or one or more intermediate pressure (IP) compressors (not shown) disposed aerodynamically between the LP compressor 22 and the HP compressor 24; a combustion section 26; a turbine section 31 including a high pressure (HP) turbine 28, a low pressure (LP) turbine 30, and/or one or more intermediate pressure (IP) turbines (not shown) disposed aerodynamically between the HP turbine 28 and the LP turbine 30; and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. In other embodiments, an IP rotor shaft drivingly connects the IP turbine to the IP compressor (not shown). The LP rotor shaft 36 may also, or alternatively, be connected to a fan shaft 38 of the fan assembly 14. In particular embodiments, such as shown in FIG. 3, the LP shaft 36 may be connected to the fan shaft 38 via a power or reduction gear assembly 40 such as in an indirect-drive or geared-drive configuration.

Combinations of the compressors 22, 24, the turbines 28, 30, and the shafts 34, 36, 38 each define a rotor assembly of the apparatus 10. For example, in various embodiments, the LP turbine 30, the LP shaft 36, the fan assembly 14 and/or the LP compressor 22 together define the rotor assembly as a low pressure (LP) rotor assembly. The rotor assembly may further include the fan rotor 38 coupled to the fan assembly 14 and the LP shaft 36 via the gear assembly 40. As another example, the HP turbine 28, the HP shaft 34, and the HP compressor 24 may together define the rotor assembly as a high pressure (HP) rotor assembly. It should further be appreciated that the rotor assembly may be defined via a combination of an IP compressor, an IP turbine, and an IP shaft disposed aerodynamically between the LP rotor assembly and the HP rotor assembly.

As shown in FIG. 3, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

During operation of the apparatus 10, a volume of air as indicated schematically by arrows 74 enters the apparatus 10 through an associated inlet 76 of the nacelle 44 and/or fan assembly 14. As the air 74 passes across the fan blades 42 a portion of the air as indicated schematically by arrows 78 is directed or routed into the bypass airflow passage 48, through which most propulsive thrust is generally generated, while another portion of the air as indicated schematically by arrow 80 is directed or routed into the LP compressor 22. Air 80 is progressively compressed as it flows through the LP and HP compressors 22, 24 towards the combustion section 26.

Referring still to FIG. 3, the combustion gases 86 generated in the combustion section 26 flows to the HP turbine 28 of the turbine section 31, thus causing the HP shaft 34 to rotate, thereby supporting operation of the HP compressor 24. As shown in FIG. 3, the combustion gases 86 are then routed to the LP turbine 30, thus causing the LP shaft 36 to rotate, thereby supporting operation of the LP compressor 22 and rotation of the fan shaft 38. The combustion gases 86 are then exhausted through the jet exhaust nozzle section 32 of the core engine 16 to provide propulsive thrust.

As operation of the apparatus 10 transitions from rest or zero RPM to startup and ignition, a minimum steady state operating condition (i.e., minimum steady state air and fuel flow through the core engine 16 to sustain approximately zero acceleration), a maximum steady state operating condition (i.e., maximum steady state air and fuel flow through the core engine 16 to sustain approximately zero acceleration), or one or more intermediate steady state operating conditions therebetween, the actuator assembly 90 may be incorporated at a variable vane assembly 100 at the apparatus 10 to adjust an angle of attack or a rotational angle of axially separated stages of vanes (e.g., vanes at one or more of the fan section 14, the compressor section 21, the turbine section 31, etc.).

Referring back to FIG. 3, the controller 210 can generally correspond to any suitable processor-based device, including one or more computing devices. For instance, FIG. 3 illustrates one embodiment of suitable components that can be included within the controller 210. As shown in FIG. 3, the controller 210 can include a processor 212 and associated memory 214 configured to perform a variety of computer-implemented functions. In various embodiments, the controller 210 may be configured to operate the actuator assembly 90 such as to provide a signal to the control valve 140 commanding supply or modulation of the pressure of the motive fluid to the input drive assembly 130.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. The control logic 216 may include instructions that when executed by the one or more processors 212 cause the one or more processors 212 to perform operations such as rotating, extending, or retracting, or otherwise displacing the actuator assembly 90.

Additionally, as shown in FIG. 3, the controller 210 may also include a communications interface module 230. In various embodiments, the communications interface module 230 can include associated electronic circuitry that is used to send and receive data. As such, the communications interface module 230 of the controller 210 can be used to receive data from the actuator assembly 90, or from position sensors from vane assemblies attached thereto.

In addition, the communications interface module 230 can also be used to communicate with any other suitable components of the actuator assembly 90 or the apparatus 10, such as to receive data or send commands to/from any number of valves, vane assemblies, hydraulic or pneumatic systems providing motive fluid, rotor assemblies, ports, etc. controlling speed, pressure, or flow at the apparatus 10 or actuator assembly 90 including the control valve assembly 140.

It should be appreciated that the communications interface module 230 can be any combination of suitable wired and/or wireless communications interfaces and, thus, can be communicatively coupled to one or more components of the actuator assembly 90 via a wired and/or wireless connection. As such, the controller 210 may operate, modulate, or adjust operation of the actuator assembly 90, and/or acquire or transmit signals via the actuator assembly 90 including the control valve 140.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An actuator assembly, the actuator assembly comprising:
   an output shaft;
   an input drive assembly including an input shaft; and
   a piston assembly including a body surrounding a piston moveable within the body, wherein the body defines a first end and a second end opposite thereof between which the piston is moveable within the body, and further wherein the piston assembly includes a spring disposed between the body and the piston, and wherein the piston assembly includes a friction mechanism disposed at the second end opposite of the first end, wherein the friction mechanism includes a friction disc configured to engage together the piston and the input drive assembly, and wherein an adjustable area is defined within the body between the second end and the input drive assembly.

2. The actuator assembly of claim 1, wherein the body defines a groove extended laterally between the first end and the second end, and wherein the piston is at least partially disposed in the groove to prevent rotation of the piston.

3. The actuator assembly of claim 1, wherein the body defines an opening therethrough in fluid communication with the adjustable area between the piston and the input drive assembly.

4. The actuator assembly of claim 1, further including:
   a control valve assembly configured to provide and egress a motive fluid to the adjustable area between the piston and the input drive assembly.

5. The actuator assembly of claim 4, wherein the control valve assembly is configured to provide the motive fluid to the adjustable area between the piston and the input drive assembly equal and opposite to a force applied by the spring toward the input drive assembly.

6. The actuator assembly of claim 4, wherein the control valve assembly is configured to egress the motive fluid from the adjustable area between the piston and the input drive assembly following loss of a signal to the control valve assembly.

7. The actuator assembly of claim 6, wherein the piston assembly is configured to engage the input drive assembly via the friction mechanism following egress of the motive fluid from the adjustable area between the piston and the input drive assembly.

8. The actuator assembly of claim 1, wherein the piston defines one or more of a stop collar or a servo-controller piston.

9. An apparatus for fail fix actuation, the apparatus comprising:
   an actuator assembly, wherein the actuator assembly includes an output shaft, an input drive assembly including an input shaft, and a piston assembly including a body surrounding a piston moveable within the body, wherein the body defines a first end and a second end opposite thereof between which the piston is moveable within the body, and further wherein the piston assembly includes a spring disposed between the body and the piston, and wherein the piston assembly includes a friction mechanism disposed at the second end opposite of the first end, wherein the friction mechanism includes a friction disc configured to engage together the piston and the input drive assembly, and wherein an adjustable area is defined within the body between the second end and the input drive assembly, and wherein the actuator assembly further comprises a control valve assembly configured to provide and egress a motive fluid to the adjustable area between the piston and the input drive assembly; and
   a controller including:
      at least one memory;
      instructions; and
      processor circuitry to execute the instructions to provide a signal to the control valve assembly of the actuator assembly.

10. The apparatus of claim 9, wherein the controller provides the signal for the control valve assembly to close an input opening at the control valve assembly, wherein closing the input opening maintains the motive fluid at the adjustable area between the piston and the input drive assembly equal and opposite to a force applied by the spring toward the input drive assembly.

11. The apparatus of claim 10, wherein the control valve assembly is configured to egress the motive fluid from the adjustable area between the piston and the input drive assembly following loss of the signal from the controller to the control valve assembly.

12. The apparatus of claim 11, wherein the control valve assembly is configured to close an input opening at the control valve assembly to disable the motive fluid from the adjustable area between the piston and the input drive assembly.

13. The apparatus of claim 11, wherein the piston assembly is configured to engage the input drive assembly via the friction mechanism following egress of the motive fluid from the adjustable area between the piston and the input drive assembly.

14. The apparatus of claim 9, wherein the body defines a groove extended laterally between the first end and the second end, and wherein the piston is at least partially disposed in the groove to prevent rotation of the piston.

15. The apparatus of claim 9, wherein the body defines an opening therethrough in fluid communication with the adjustable area between the piston and the input drive assembly.

16. The apparatus of claim 9, wherein the piston defines one or more of a stop collar or a servo-controller piston.

17. An apparatus for fail fix actuation, the apparatus comprising:

means for engaging together a piston and an input drive assembly, the piston moveable within a body surrounding the piston, wherein the body defines a first end and a second end opposite thereof between which the piston is moveable within the body, and further wherein a spring is disposed between the body and the piston, and wherein an adjustable area is defined within the body between the second end and the input drive assembly; and means for providing and egressing a motive fluid to the adjustable area between the piston and the input drive assembly.

18. The apparatus of claim 17, including:

means for maintaining the motive fluid at the adjustable area between the piston and the input drive assembly equal and opposite to a force applied by the spring toward the input drive assembly.

19. The apparatus of claim 18, including means for egressing the motive fluid from the adjustable area between the piston and the input drive assembly following loss of a signal.

20. The apparatus of claim 19, wherein the means for engaging engages together the piston and the input drive assembly following egress of the motive fluid from the adjustable area between the piston and the input drive assembly.

* * * * *